(12) United States Patent
Harmer

(10) Patent No.: US 8,086,838 B2
(45) Date of Patent: Dec. 27, 2011

(54) METHODS AND SYSTEMS FOR PROVIDING MANUFACTURING MODE DETECTION AND FUNCTIONALITY IN A UEFI BIOS

(75) Inventor: Tracy D. Harmer, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 683 days.

(21) Appl. No.: 12/228,499

(22) Filed: Aug. 13, 2008

(65) Prior Publication Data

US 2010/0042821 A1 Feb. 18, 2010

(51) Int. Cl.
*G06F 9/00* (2006.01)
*G06F 15/177* (2006.01)

(52) U.S. Cl. .......................................................... 713/2
(58) Field of Classification Search .................. 713/2
See application file for complete search history.

(56) References Cited

U.S. PATENT DOCUMENTS

| | | | |
|---|---|---|---|
| 6,973,564 B2 | 12/2005 | Merkin et al. ..................... 713/1 |
| 7,185,190 B2 | 2/2007 | Rothman et al. .................. 713/2 |
| 7,191,328 B2 | 3/2007 | Hobson ............................. 713/2 |
| 7,203,831 B2 | 4/2007 | Wu et al. ........................ 713/100 |
| 7,240,190 B2 | 7/2007 | Lai ..................................... 713/2 |
| 7,363,482 B2 | 4/2008 | Zimmer et al. ................... 713/2 |
| 7,415,547 B1 * | 8/2008 | Naborskyy et al. ............. 710/15 |
| 2005/0071624 A1 | 3/2005 | Rothman et al. ............... 713/100 |
| 2008/0028200 A1 | 1/2008 | Polyudov ............................. 713/2 |
| 2008/0270779 A1 * | 10/2008 | Wilson .............................. 713/1 |

OTHER PUBLICATIONS

Banga, Dr. Gaurav, "*Bridging BIOS to UEIF*," Phoenix Technologies, Jul. 15, 2007.
Zimmer, Vincent, "*Introducing the Intel Platform Innovation Framework for the Extensible Firmware Interface*," DEVICEFORGE. COM, Feb. 3, 2004.
UEFI Forum, "*The UEFI Primer*," www.uefi.org, Apr. 2008.

* cited by examiner

*Primary Examiner* — Mohammed Rehman
(74) *Attorney, Agent, or Firm* — O'Keefe, Egan, Peterman & Enders, LLP

(57) ABSTRACT

Methods and systems are described for managing manufacturing modes in a unified extensible firmware interface (UEFI) basic input output system (BIOS). The UEFI BIOS can include a PEI (pre-EFI) manufacturing mode driver, a PEI interface, PEI drivers, a DXE (driver execution environment) manufacturing mode driver, a DXE interface, DXE drivers, a SMM (system management mode) manufacturing mode driver, a SMM interface, and SMM drivers. Manufacturing mode data is stored and accessed through a PEI manufacturing mode driver, a DXE manufacturing mode driver, or a SMM manufacturing mode driver, and/or any combination thereof. The PEI interface is used to communicate manufacturing mode data between PEI drivers and the PEI manufacturing mode driver. The DXE interface is used to communicate manufacturing mode data between DXE drivers and the DXE manufacturing mode driver. And the SMM interface is used to communicate manufacturing mode data between SMM drivers and the SMM manufacturing mode driver.

18 Claims, 4 Drawing Sheets

METHODS AND SYSTEMS FOR PROVIDING MANUFACTURING MODE DETECTION AND FUNCTIONALITY IN A UEFI BIOS

TECHNICAL FIELD

The present invention relates to BIOS (basic input output system) for computer systems and, more particularly, to UEFI (unified extensible firmware interface) BIOS implementations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, such as desktop, portable and server computer systems, use a BIOS (basic input out system) at power up to start the operation of the system prior to loading of an operating system. The BIOS can also be used by the operating system after it starts. Traditionally, the BIOS is designed to be specific for particular computer systems and/or hardware within those computer systems.

In order to simplify the hardware interface for such information handling systems, a new UEFI (unified extensible firmware interface) BIOS was proposed. The UEFI BIOS provides a layer between the hardware and the BIOS code to provide a standardized interface that is not dependent upon the underlying hardware in the system. UEFI implementations, for example, those set forth by Intel Corporation, can have BIOS codes segments including PEI (pre-EFI) code, DXE (driver execution environment) code and SMM (system management mode) code. These different PEI, DXE and SMM codes segments run at different times during the start-up of an information handling system running the UEFI BIOS.

Some system manufacturers, such as Dell Inc., use manufacturing modes to facilitate the manufacture of information handling systems. The BIOS code can then be designed to use the manufacturing modes and manufacturing mode data during manufacture of a system.

FIG. 1A (Prior Art) depicts a manufacturing mode implementation 100 for a typical desktop computer system. As depicted, a plurality of desktop BIOS code segments 102, 104, 106 . . . communicate with and use a plurality of manufacturing (MFG) mode utilities 108 to determine manufacturing mode conditions and to store access/store manufacturing mode data 110. In particular, a plurality of manufacturing mode utilities 112, 114 . . . 116 can be used by the desktop BIOS code segments 102, 104, 106 . . . . Similarly, a wide variety of information blocks 122, 124 . . . 126 can store manufacturing mode data for the desktop BIOS code segments 102, 104, 106 . . . . One such information block that has been used is a stop-ship (SS) bit 122 that has represented whether or not a system stop-ship order has been set by one or more of the desktop BIOS code segments 102, 104, 106 . . . during the manufacturing of the system.

FIG. 1B (Prior Art) depicts a manufacturing mode implementation 150 for a typical portable computer system. As depicted, a plurality of portable BIOS code segments 152, 154, 156 . . . communicate with and use a centralized manufacturing (MFG) mode utility 158 to determine manufacturing mode conditions and to store access/store manufacturing mode data 160. A wide variety of information blocks 152, 154 . . . 156 can store manufacturing mode data for the portable BIOS code segments 152, 154, 156 . . . . As with FIG. 1A, one such information block that has been used is a stop-ship (SS) bit 152 that has represented whether or not a system stop-ship order has been set by one or more of the portable BIOS code segments 152, 154, 156 . . . during the manufacturing of the system.

While the manufacturing mode enabled systems of FIG. 1A (Prior Art) and FIG. 1B (Prior Art) have advantageous, they are not compatible with each other and are not UEFI compatible systems.

SUMMARY

Methods and systems are described herein for managing manufacturing modes in a unified extensible firmware interface (UEFI) basic input output system (BIOS). The methods and systems described include a processor within an information handling system and a storage device coupled to communicate with the processor. The storage device includes a unified extensible firmware interface (UEFI) basic input output system (BIOS) stored thereon, the UEFI BIOS including a PEI (pre-EFI) manufacturing mode driver, a PEI interface, PEI drivers, a DXE (driver execution environment) manufacturing mode driver, a DXE interface, DXE drivers, a SMM (system management mode) manufacturing mode driver, a SMM interface, and SMM drivers. The PEI interface is used to communicate manufacturing mode data between PEI drivers and the PEI manufacturing mode driver. The DXE interface is used to communicate manufacturing mode data between DXE drivers and the DXE manufacturing mode driver. And the SMM interface is used to communicate manufacturing mode data between SMM drivers and the SMM manufacturing mode driver. Still further, manufacturing mode data is stored in a data storage device through the PEI manufacturing mode driver, the DXE manufacturing mode driver, or the SMM manufacturing mode driver, or any combination thereof. And manufacturing mode data is accessed from the data storage device through the PEI manufacturing mode driver, the DXE manufacturing mode driver, or the SMM manufacturing mode driver, or any combination thereof. The manufacturing mode data can include manufacturing date information, such as a date of manufacture and a first power on date. And the manufacturing mode data can include stop-ship information including a count of stop-ship events and who/why information for each stop-ship event. As described below, other features and variations can be implemented, if desired, and related systems and methods can be utilized, as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Methods and systems are disclosed for manufacturing mode implementations for information handling systems having a UEFI (unified extensible firmware interface) BIOS (basic input output system).

Figure 2:
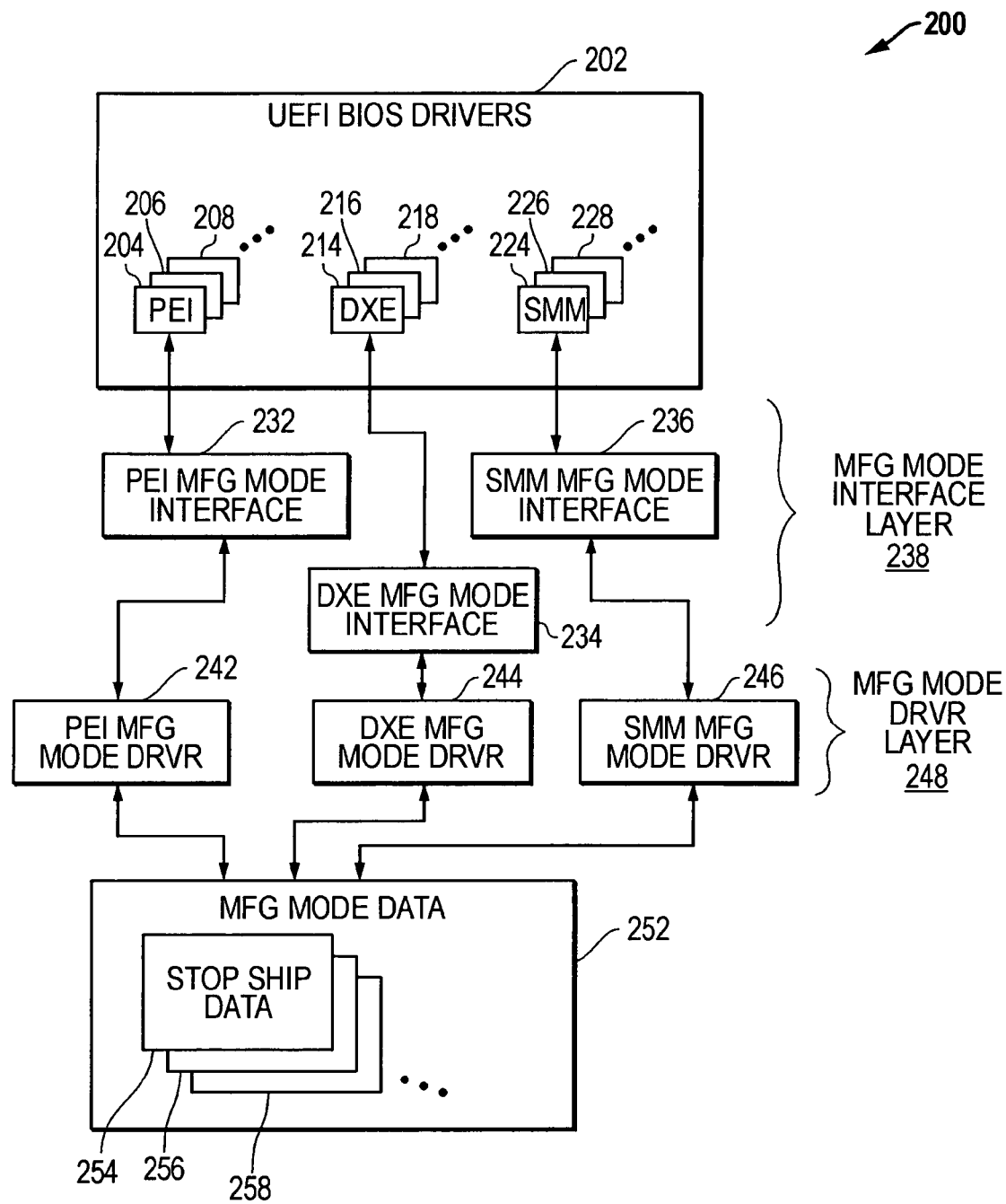
FIG. 2 is a block diagram for a UEFI (unified extensible firmware interface) BIOS (basic input out system) manufacturing mode implementation.

FIG. 2 is a block diagram for an embodiment 200 for a UEFI BIOS manufacturing mode implementation. As depicted, a plurality of UEFI BIOS drivers 202 communicate with a manufacturing mode interface layer 238. This manufacturing mode interface layer 238 then communicates with a manufacturing mode driver layer 248 to access and store manufacturing mode data 252. More particularly, a plurality of PEI (pre-EFI) code segments 204, 206, 208 . . . communicate with a PEI manufacturing mode interface 232, which in turn communicates with a PEI manufacturing mode driver 242 to access and store manufacturing mode data 252. A plurality of DXE (driver execution environment) code segments 214, 216, 218 . . . communicate with a DXE manufacturing mode interface 234, which in turn communicates with a DXE manufacturing mode driver 244 to access and store manufacturing mode data 252. And a plurality of SMM (system management mode) code segments 224, 226, 228 . . . communicate with a SMM manufacturing mode interface 236, which in turn communicates with a SMM manufacturing mode driver 246 to access and store manufacturing mode data 252. The manufacturing mode data 252 can include a plurality of different manufacturing mode information blocks 254, 256, 258 . . . accessible to the manufacturing mode driver layer 248.

Figures 1A, 1B:
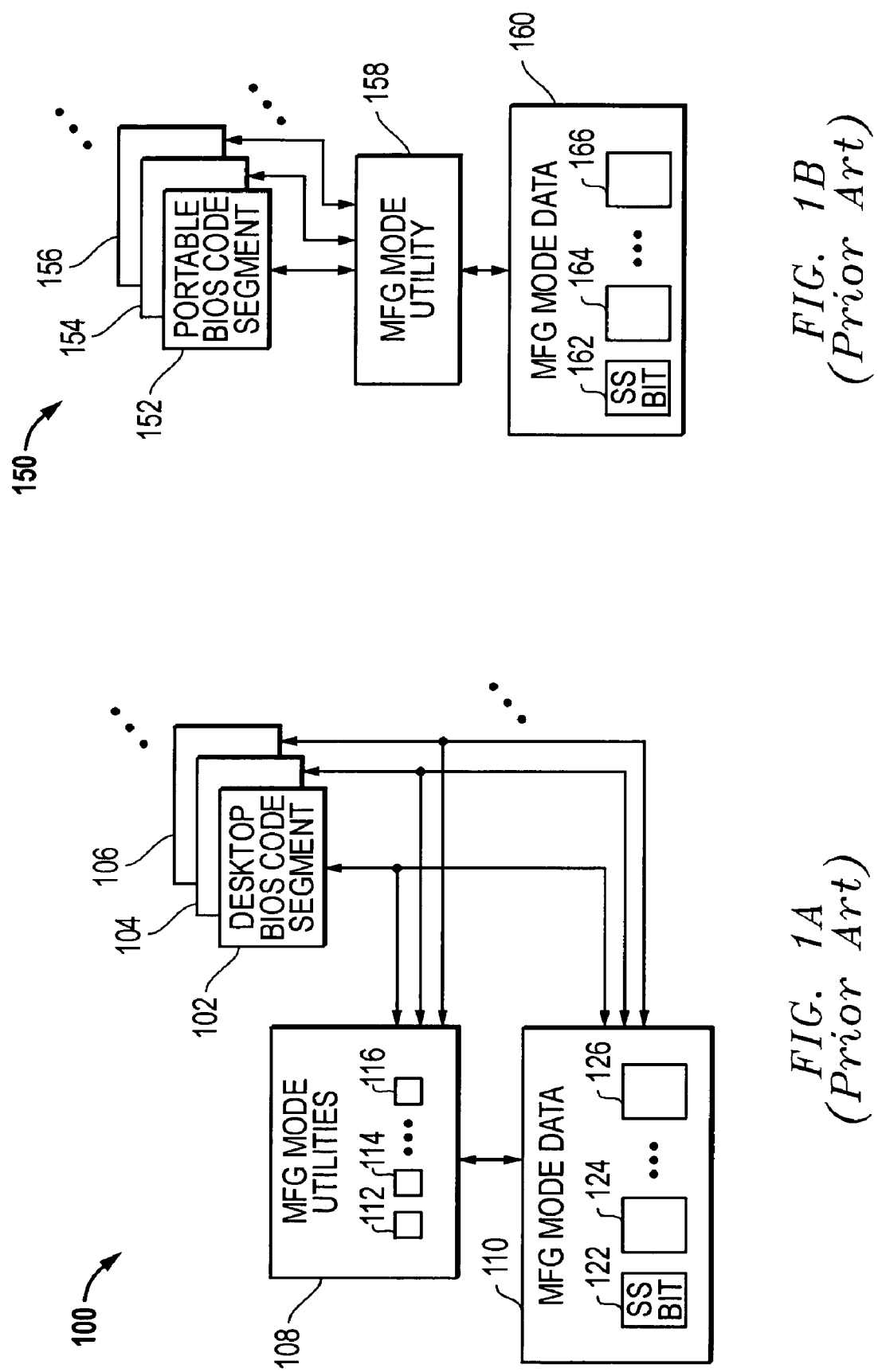
FIG. 1A (Prior Art) is a block diagram for a manufacturing mode implementation for desktop computer systems.
FIG. 1B (Prior Art) is a block diagram for a manufacturing mode implementation for portable computer systems.

As depicted, the data block 254 is configured to store stop-ship data. This data can include, for example, a count to indicate how many stop-ship events have occurred, identification of which code segment/driver encountered the stop-ship event (who data) and identification of what caused the stop-ship event (what data). This stop-ship data has significant advantages over the single bit indicator used in the embodiments of FIG. 1A (Prior Art) and FIG. 1B (Prior Art).

The manufacturing mode data 252 can also include other manufacturing related data, as desired. For example, information concerning the manufacture date for the system can be stored, as well as the date upon which the system of first powered subsequent to manufacture. This latter power-on date can be used, for example, to determine when a user first powers the system after purchase. In addition, security related information can be stored as manufacturing mode data. Other information could be stored, as desired.

It is noted that the manufacturing mode drivers in layer 248 provide functionality and capabilities for the manufacturing mode UEFI design. A set of common protocols, depicted as interfaces 238, are thereby provided to allow for common and generic access to various modes and conditions that are stored within the manufacturing mode data 252 in order to implement various manufacturing modes, service mode jumper, and stop-ship error detection and reporting. These common protocols are configured to provide enhanced capabilities beyond what is currently available for prior BIOS related manufacturing mode implementations.

The SMM manufacturing mode interface 236 can be configured to provide a common protocol for implementing manufacturing and test requirements. The interface to other SMM code segments 224, 226, 228 . . . is through UEFI protocols associated with the interface 236 for the SMM manufacturing mode driver 246. The SMM manufacturing mode driver 246 can also provide the interface for external calls to the manufacturing mode data 252.

The DXE manufacturing mode interface 234 can be configured to provide a common protocol for implementing manufacturing and test requirements. The interface to other DXE code segments 214, 216, 218 . . . is through UEFI protocols associated with the interface 234 for the DXE manufacturing mode driver 244. The DXE manufacturing mode driver 244 can also manage the manufacturing and test related data in the system. The DXE manufacturing mode driver 244 can also provide a set of runtime services to support testing in an operating system environment.

The PEI manufacturing mode interface 236 can be configured to provide a subset protocol for the PEI manufacturing mode driver 242 which can be configured to provide a subset support for implementing manufacturing and test requirements as compared to the DXE manufacturing mode driver 244. In other words, the PEI manufacturing mode driver 242 can provide only what is needed before the DXE manufacturing mode driver 244 can be loaded in the system during the boot process.

Each of the PEI, DXE and/or SMM code segments/drivers 202 can use the appropriate manufacturing mode driver interface protocol when needed. Each individual code segment does not have to know how the manufacturing mode is detected in the hardware. And the UEFI manufacturing mode implementation allows encapsulation of interfaces and utility functions that have been previously spread throughout the BIOS code.

The manufacturing mode PEI, DXE and SMM drivers in layer 248, therefore, encapsulate the functionality required to detect and identify manufacturing modes. These drivers can also report problems that occur during manufacturing of each system. This set of UEFI drivers provide a common interface and protocols for the UEFI BIOS to use with the following: (1) an abstracted and secure method of implementing and storing manufacturing modes to support systems needs, (2) determining current manufacturing modes, if any, during each system boot, (3) setting/clearing manufacturing modes through a secure interface with a manufacturing mode utility, (4) enhanced stop-ship error reporting with a stop-ship count and who/why codes, (5) common method of supporting manufacturing mode functionality for all BIOS code segments, (6) the same common functionality available as a UEFI runtime service to support operating system based utilities, and (7) a common interface through which to store, retrieve and provide access to all manufacturing mode related data.

Advantageously, as a result of this manufacturing mode support in a UEFI design, each PEI, DXE or SMM driver does not need to understand or implement code to determine manufacturing modes. The UEFI BIOS code can use common manufacturing mode driver protocols to determine if a manufacturing mode is active. UEFI BIOS code outside of the manufacturing mode drivers does not have to know how or where manufacturing modes or other manufacturing mode data is stored or how it is implemented, set or obtained on a particular system. In addition, the manufacturing mode UEFI BIOS implementation also shields the rest of UEFI BIOS code to changes in how and where manufacturing related data is stored and/or implemented with respect to a particular system.

It is further noted that the UEFI BIOS can have manufacturing mode functionality for the PEI drivers, the DXE drivers, or SMM drivers, or any combination thereof. As such, the UEFI BIOS could be implemented solely with the DXE manufacturing mode interface 234 and the DXE manufacturing mode driver 244, if desired. The UEFI BIOS could be implemented solely with the the PEI manufacturing mode interface 232 and the PEI manufacturing mode driver 241, if desired. And the UEFI BIOS could be implemented solely with the SMM manufacturing mode interface 236 and the SMM manufacturing mode driver 246, if desired. Combinations of the DXE, PEI and SMM manufacturing mode functionality (e.g., DXE+PEI, DXE+SMM, PEI+SMM) can also be implemented within the UEFI BIOS, if desired. And manufacturing mode functionality for all three (e.g., DXE+SMM+PEI) can be implemented with the UEFI BIOS, if desired.

Figure 3:
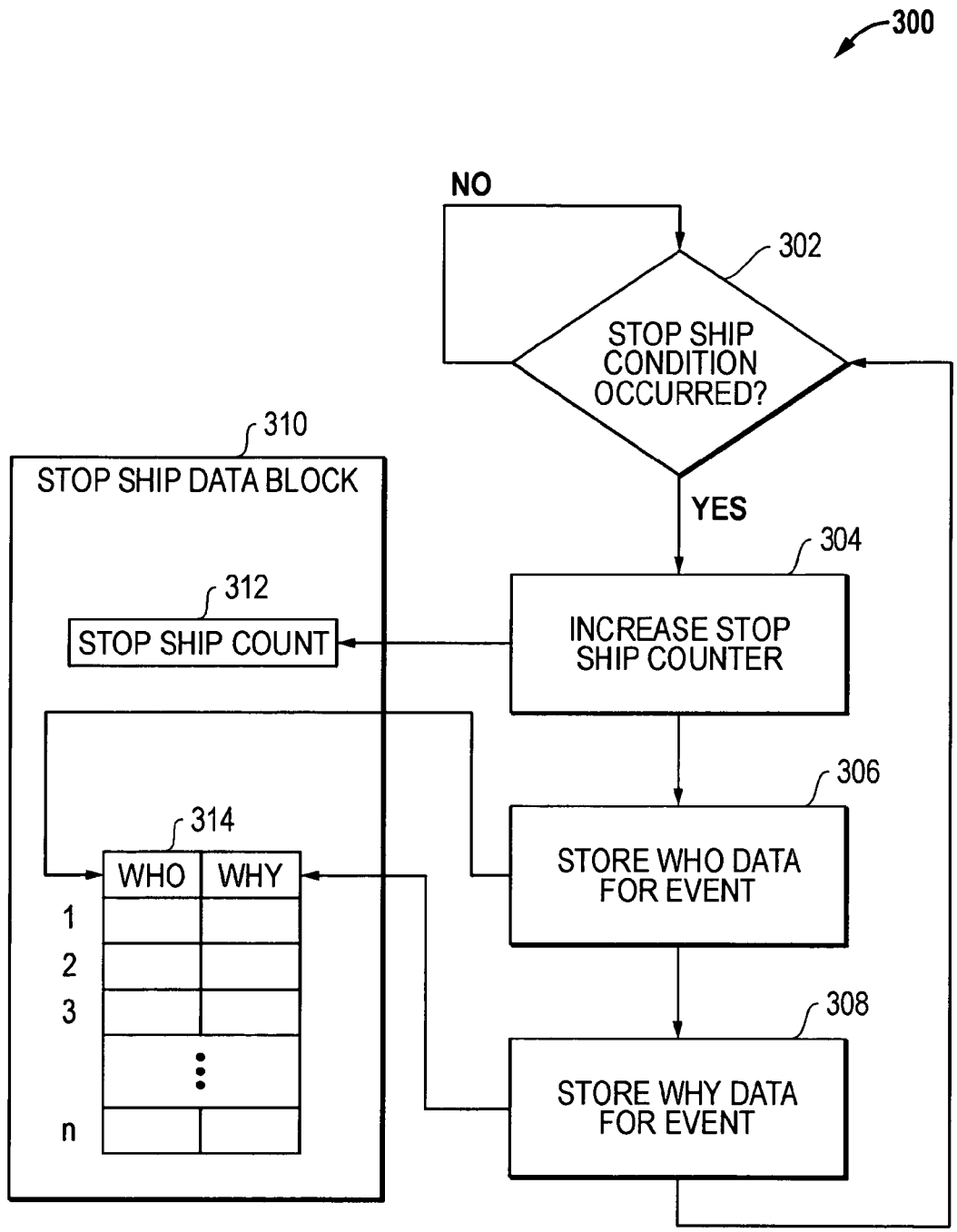
FIG. 3 is a flow diagram for a stop-ship manufacturing data acquisition associated with a UEFI (unified extensible firmware interface) BIOS (basic input out system) manufacturing mode implementation.

FIG. 3 is a flow diagram for an embodiment 300 for stop-ship manufacturing data acquisition associated with a UEFI BIOS manufacturing mode implementation. In decision block 302, a determination is made as to whether a stop-ship condition has occurred. If "NO," then flow passes back to block 302. If "YES," then flow passes to block 304 where a stop-ship counter 312 within a stop-ship data block 310 is increased by one to indicate that a stop-ship event has occurred. This counter can begin at zero, if desired. Next, in block 306, the "who" identity of the code segment that encountered the stop-ship event is stored in a who/why pair table 314 within the stop-ship data block 310. In block 308, "why" information for the stop-ship event can be stored in the who/why pair table 314 within the stop-ship data block 310 to indicate why the event occurred. In one embodiment, the stop-ship data block 310 can be a data register in which the count 312 is stored along with the table 314 of who/why pairs, in which the who code and a why code for each stop-ship event is stored. This stop-ship data block 310 can then be read at a later date to determine how many stop-ship event occurred and the who/why data for each of these stop-ship events that occurred with respect to the manufacturing of the system.

If desired, a limit can be placed on the number to which the count can be incremented. Also, a limit to the number of who/why pairs that are stored can be provided. For example, the count could be allowed to range from 0 to 7 (3-bits), and the number of who/why code pairs can be restricted to three. In such an example, while the count can keep incrementing to seven stop-ship events, the who/why pairs are no longer stored after the third stop-ship event.

Figure 4:
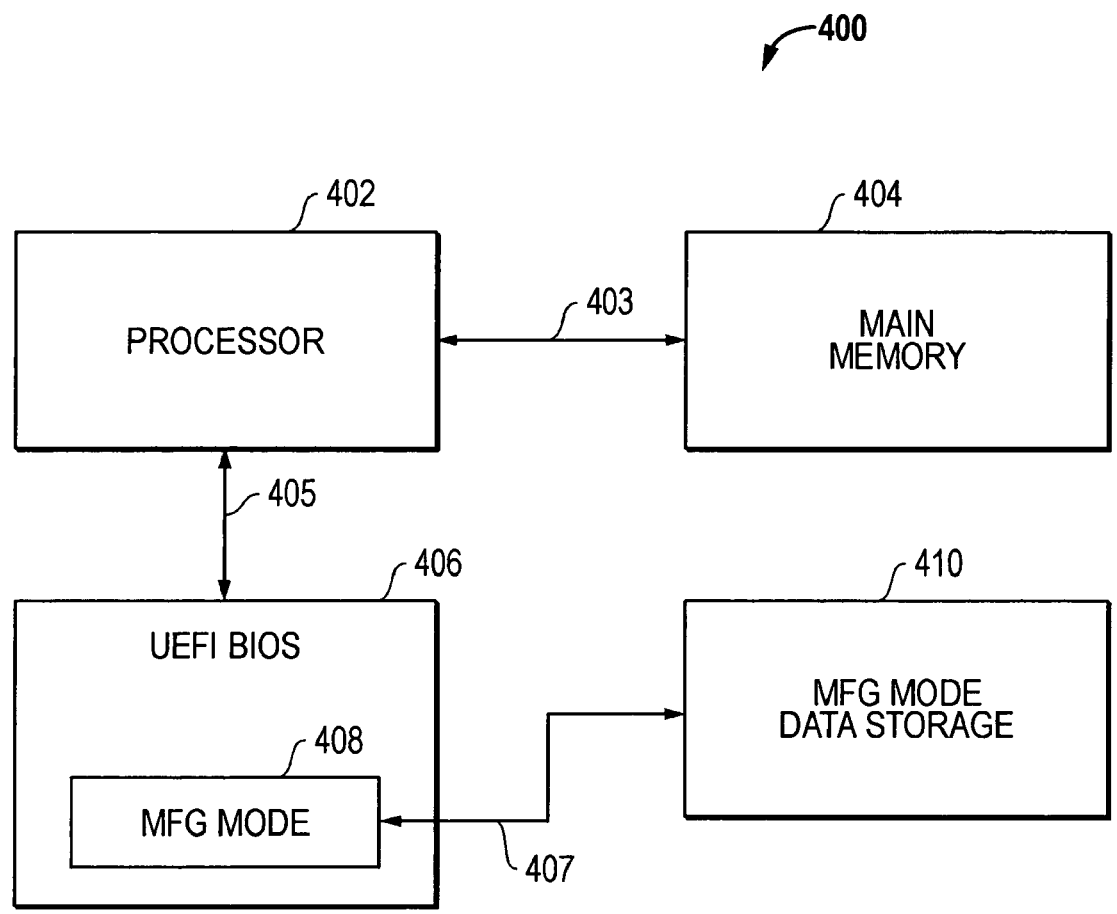
FIG. 4 is a block diagram for an information handling system including a UEFI (unified extensible firmware interface) BIOS (basic input out system) having manufacturing mode functionality.

FIG. 4 is a block diagram for an embodiment 400 for an information handling system including a UEFI BIOS having manufacturing mode functionality. As depicted, a processor 402, such as a central processing unit, communicates with main memory 404 through communication path 403. Processor 402 also communicates with the UEFI BIOS 406 through communication path 405. The UEFI BIOS 406 may be stored in a storage device, such as a memory, a programmable memory or other storage device. The UEFI BIOS 406 includes manufacturing mode code segments/drivers 408 that provide for some or all of the manufacturing mode functionality described herein, as well as other BIOS functionality. The manufacturing mode code 408 stores and accesses manufacturing mode data stored in manufacturing mode data storage 410 through communication path 407. The manufacturing mode data storage 410 may be implemented as a data storage device in a variety of ways. For example, the data storage 410 may be one or more registers that are part of the storage device holding the UEFI BIOS 406 or registers that are present in other integrated circuits or devices that are part of system 400. For example, the data storage 410 may be within an input/output controller or a memory controller that is part of the system 400. Still further, the data storage 410 may be included within the main memory 404, if desired.

As would be understood, a wide range of variations are possible for implementing an information handling system with a UEFI BIOS having manufacturing mode functionality.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for managing manufacturing modes in a unified extensible firmware interface (UEFI) basic input output system (BIOS), comprising:

providing a processor within an information handling system;

providing a storage device coupled to communicate with the processor and having a unified extensible firmware interface (UEFI) basic input output system (BIOS) stored thereon, the UEFI BIOS including a DXE (driver execution environment) manufacturing mode driver, a DXE interface and DXE drivers;

using the DXE interface to communicate manufacturing mode data between DXE drivers and the DXE manufacturing mode driver;

storing manufacturing mode data in a data storage device through the DXE manufacturing mode driver; and accessing manufacturing mode data from the data storage device through the DXE manufacturing mode driver;

wherein the UEFI BIOS further includes a SMM (system management mode) manufacturing mode driver, a SMM interface and SMM drivers; and further comprising using the SMM interface to communicate manufacturing mode data between SMM drivers and the SMM manufacturing mode driver, storing manufacturing mode data in a data storage device through the SMM manufacturing mode driver, and accessing manufacturing mode data from the data storage device through the SMM manufacturing mode driver; and wherein the UEFI BIOS further includes a PEI (pre-EFI) manufacturing mode driver, a PEI interface and PEI drivers; and further comprising using the PEI interface to communicate manufacturing mode data between PEI drivers and the PEI manufacturing mode driver, storing manufacturing mode data in a data storage device through the PEI manufacturing mode driver, and accessing manufacturing mode data from the data storage device through the PEI manufacturing mode driver.

2. The method of claim 1, wherein the information handling system comprises a desktop information handling system, a portable information handling system, or a server information handling system.

3. The method of claim 1, further comprising providing manufacturing date information within the manufacturing mode data, the manufacturing date information including a date of manufacture for the information handling system.

4. The method of claim 1, further comprising providing manufacturing date information within the manufacturing mode data, the manufacturing date information including a date of first power up for the information handling system.

5. The method of claim 1, further comprising providing stop-ship information within the manufacturing mode data.

6. The method of claim 5, further comprising incrementing a counter for each stop-ship event to provide a stop-ship count and storing who/why information for each stop-ship event concerning what driver encountered the stop-ship event and why the stop-ship event occurred.

7. The method of claim 6, further comprising limiting the stop-ship count to a particular number.

8. The method of claim 6, further comprising storing who/why information for a limited number of stop-ship events.

9. An information handling system having a unified extensible firmware interface (UEFI) basic input output system (BIOS) with manufacturing mode functionality, comprising:
a processor;
a storage device configured to communicate with the processor;
a data storage device configured to communicate with the storage device;
a unified extensible firmware interface (UEFI) basic input output system (BIOS) stored within the storage device, the UEFI BIOS including a DXE (driver execution environment) manufacturing mode driver, a DXE interface and DXE drivers, and the UEFI BIOS being configured in operation to:
use the DXE interface to communicate manufacturing mode data between DXE drivers and the DXE manufacturing mode driver;
store manufacturing mode data in the data storage device through the DXE manufacturing mode driver; and
access manufacturing mode data in the data storage device through the DXE manufacturing mode driver;
wherein the UEFI BIOS further includes a SMM (system management mode) manufacturing mode driver, a SMM interface and SMM drivers, and the UEFI BIOS being configured in operation to:
use the SMM interface to communicate manufacturing mode data between SMM drivers and the SMM manufacturing mode driver;
store manufacturing mode data in the data storage device through the SMM manufacturing mode driver; and
access manufacturing mode data in the data storage device through the SMM manufacturing mode driver; and
wherein the UEFI BIOS further includes a PEI (pre-EFI) manufacturing mode driver, a PEI interface and PEI drivers, and the UEFI BIOS being configured in operation to:
use the PEI interface to communicate manufacturing mode data between PEI drivers and the PEI manufacturing mode driver;
store manufacturing mode data in the data storage device through the PEI manufacturing mode driver; and
access manufacturing mode data in the data storage device through the PEI manufacturing mode driver.

10. The information handling system of claim 9, wherein the storage device and the data storage device are implemented in a single device.

11. The information handling system of claim 9, wherein the storage device and the data storage device are implemented in different devices.

12. The information handling system of claim 9, wherein the information handling system is a desktop information handling system, a portable information handling system or a server information handling system.

13. The information handling system of claim 9, wherein the manufacturing mode data includes manufacturing date information, the manufacturing date information including a date of manufacture for the information handling system.

14. The information handling system of claim 9, wherein the manufacturing mode data includes manufacturing date information, the manufacturing date information including a date of first power up for the information handling system.

15. The information handling system of claim 9, wherein the manufacturing mode data includes stop-ship information.

16. The information handling system of claim 15, further comprising a counter configured to be incremented for each stop-ship event to provide a stop-ship count and wherein the manufacturing mode data includes who/why information for each stop-ship event concerning what driver encountered the stop-ship event and why the stop-ship event occurred.

17. The information handling system of claim 16, wherein the counter is configured to have a limit to the stop-ship count.

18. The information handling system of claim 16, wherein the manufacturing mode data is configured to store who/why information for a limited number of stop-ship events.

* * * * *